(12) United States Patent
Takeuchi et al.

(10) Patent No.: US 12,041,707 B2
(45) Date of Patent: Jul. 16, 2024

(54) REPAIR DEVICE

(71) Applicant: Nippon Telegraph and Telephone Corporation, Tokyo (JP)

(72) Inventors: Yosuke Takeuchi, Musashino (JP); Masahiro Sotoma, Musashino (JP); Takuya Kamisho, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 704 days.

(21) Appl. No.: 17/269,478

(22) PCT Filed: Aug. 23, 2019

(86) PCT No.: PCT/JP2019/033118
§ 371 (c)(1),
(2) Date: Feb. 18, 2021

(87) PCT Pub. No.: WO2020/045301
PCT Pub. Date: Mar. 5, 2020

(65) Prior Publication Data
US 2021/0315066 A1 Oct. 7, 2021

(30) Foreign Application Priority Data
Aug. 29, 2018 (JP) .................. 2018-160451

(51) Int. Cl.
*H05B 6/10* (2006.01)
*E04G 23/02* (2006.01)
*H05B 6/36* (2006.01)

(52) U.S. Cl.
CPC ........... *H05B 6/10* (2013.01); *E04G 23/0218* (2013.01); *H05B 6/36* (2013.01)

(58) Field of Classification Search
CPC ........ E04G 23/0218; H05B 6/10; H05B 6/36; H05B 6/105; C21D 9/08; F16B 13/068; H02G 1/02; Y02P 10/25; Y10S 411/999
(Continued)

(56) References Cited

U.S. PATENT DOCUMENTS

2011/0084792 A1* 4/2011 Beversluis ............... H02K 3/04
336/233
2016/0230242 A1 8/2016 Nishida

FOREIGN PATENT DOCUMENTS

| JP | H04-58995 U | 5/1992 |
| JP | 4852473 B2 | 10/2011 |
| JP | 5782210 B1 | 7/2015 |

OTHER PUBLICATIONS

Michihiko Nagumo, *Function of Hydrogen in Destruction Phenomenon*, Materia, vol. 50, No. 5, 2011.
(Continued)

*Primary Examiner* — Quang T Van
(74) *Attorney, Agent, or Firm* — Workman Nydegger (57) ABSTRACT

A repair apparatus for repairing damaged reinforcing bars in a structure includes a strip-shaped conductor including conductive wires arranged in a height direction, the conductive wires being arranged in parallel, a high-frequency current generation unit configured to supply a high-frequency current between the conductive wires of a first end side of the conductor and the conductive wires of a second end side of the conductor, and a connection body configured to connect the conductive wires to each other and connect the first end side and the second end side of the conductor so that the conductive wires form a coil, and the high-frequency current generation unit supplies a high-frequency current between a conductive wire at an upper end or a lower end of the first
(Continued)

end side of the conductor and a conductive wire at a lower end or an upper end of the second end side of the conductor.

4 Claims, 8 Drawing Sheets

(58) Field of Classification Search
USPC .............................. 219/674, 672, 643, 646
See application file for complete search history.

(56) References Cited

OTHER PUBLICATIONS

Tomoki Doshida et al., *Enhanced Lattice Defect Formation Associated with Hydrogen and Hydrogen Embrittlement under Elastic Stress of a Tempered Martensitic Steel*, Iron and Steel, vol. 98, No. 5, 2012.

* cited by examiner

REPAIR DEVICE

TECHNICAL FIELD

The present invention relates to a repair apparatus for repairing reinforcing bars embedded in a structure.

BACKGROUND ART

There is concern that a large number of reinforced concrete structures constructed during a high economic growth period deteriorate over time. Measures such as a sacrificial anode method are taken against corrosion of reinforcing bars in structures. However, regarding delayed fracture due to stress applied to reinforcing bars, measures such as repair and renewal are typically taken as soon as cracks are found in concrete, and there are no measures for repairing damaged reinforcing bars.

Deterioration of reinforcing bars that causes delayed fracture is caused by growth of dislocations and formation of vacancies when stress is applied. It has been reported, for example, in Non Patent Literature 1 that lattice defects formed when stress is applied to reinforcing bars cause deterioration of the reinforcing bars, and it has been reported, for example, in Non Patent Literature 2 that damage caused by growth of lattice defects of reinforcing bars is eliminated through annealing treatment at 200° C.

CITATION LIST

Non Patent Literature

Non Patent Literature 1: Michihiko Nagumo, "Materia", Vol. 50, No. 5, 2011.

Non Patent Literature 2: Tomoki Doshinoda and 4 others, "Iron and Steel", Vol. 98 (2012) No. 5

SUMMARY OF THE INVENTION

Technical Problem

However, there is still no apparatus for repairing damaged reinforcing bars in a structure such as a reinforced concrete structure.

The present invention has been made in view of this problem, and an object of the present invention is to provide a repair apparatus for repairing damaged reinforcing bars in a structure.

Means for Solving the Problem

A repair apparatus according to the present invention is a repair apparatus including a strip-shaped conductor including a plurality of conductive wires arranged in a height direction, the plurality of conductive wires being arranged in parallel to each other, and a high-frequency current generation unit configured to supply a high-frequency current between the plurality of conductive wires of a first end side of the conductor and the plurality of conductive wires of a second end side of the conductor.

Effects of the Invention

With the repair apparatus according to the present invention, it is possible to repair damaged reinforcing bars in a structure.

BRIEF DESCRIPTION OF DRAWINGS

FIG. 2 is a diagram schematically illustrating a state in which a conductor of the repair apparatus illustrated in FIG. 1 is installed around a structure.

FIG. 3(a) is an appearance view, and FIG. 3(b) is a cross-sectional view illustrating a cross section along line B-B.

FIG. 4(a) is a top view, and FIG. 4(b) is a front view.

FIG. 5 is a diagram schematically illustrating another example of the fixture constituting the repair apparatus according to the first embodiment of the present invention.

FIG. 7 is a diagram schematically illustrating an example of a case in which a plurality of the fixtures illustrated in FIG. 4 are manufactured in correspondence with a height direction of a utility pole.

DESCRIPTION OF EMBODIMENTS

Hereinafter, embodiments of the present invention will be described with reference to the drawings. The same portions in a plurality of the drawings are denoted by the same reference signs, and a description thereof will not be repeated.

First Embodiment

Figure 1:
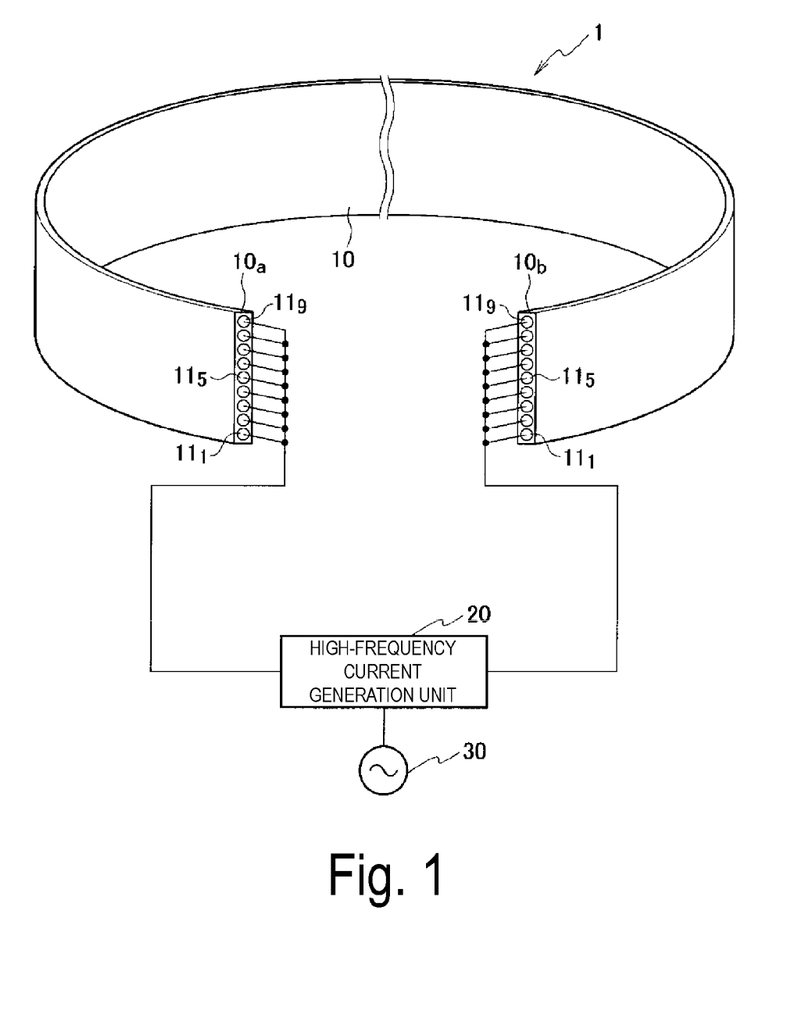
FIG. 1 is a schematic diagram illustrating an example of a configuration of a repair apparatus according to a first embodiment of the present invention.

FIG. 1 is a diagram schematically illustrating an example of a configuration of a repair apparatus according to a first embodiment of the present invention. The repair apparatus 1 illustrated in FIG. 1 repairs damaged reinforcing bars in a structure. A target to be repaired is a reinforcing bar embedded in a structure of concrete or a resin (thermosetting resin).

It is reported that lattice defects that cause deterioration of reinforcing bars are eliminated through annealing treatment at 200° C., as described in the background art. Thus, lattice defects that cause deterioration can be eliminated by heating reinforcing bars in a structure to a temperature of 200° C.

The repair apparatus 1 includes a strip-shaped conductor 10, a high-frequency current generation unit 20, and a power supply 30. The power supply 30 is a common one and may be included in the high-frequency current generation unit 20.

The strip-shaped conductor 10 includes a plurality of conductive wires 11 arranged in a height direction, and the plurality of conductive wires 11 are arranged in parallel to each other. The conductive wire 11 is, for example, a litz wire that is a bundle of magnet wire strands. A litz wire is made by twisting thin insulated copper wires for the purpose of avoiding an increase in effective resistance due to a skin effect when a high-frequency current flows.

In the conductor 10 illustrated in FIG. 1, nine conductive wires 111 to 119 are arranged in the height direction, and the nine conductive wires 111 to 119 are arranged in parallel to each other. The conductor 10 is made of a flexible material having high heat resistance. The conductor 10 is formed by incorporating the litz wire into a heat resistant glass fiber such as a silica glass fiber, a glass fiber, or a fiber textile.

The high-frequency current generation unit 20 supplies a high-frequency current between the conductive wires 11 of a first end side 10a of the conductor 10 and the conductive wires 11 of a second end side 10b of the conductor 10. A frequency of the high-frequency current ranges, for example, from 5 kHz to 500 kHz, and power thereof ranges from about 1 kW to 100 kW.

Various methods can be considered for connection of the high-frequency current generation unit 20 and the conductor 10. For example, the conductive wires 111 to 119 of the first end side 10a and the second end side 10b of the conductor 10 may be connected to each other and the high-frequency current generation unit 20 may be connected between these wires, as illustrated in FIG. 1.

Further, a high-frequency current may be supplied to each of the conductive wires 11. In this case, a plurality of the high-frequency current generation units 20 are prepared. Further, the number of connections of the conductive wires 11 to each other at the end sides 10a and 10b may be changed in correspondence with the number of the high-frequency current generation units 20.

The strip-shaped conductor 10 is installed by being wrapped around a structure in which there is concern over deterioration of reinforcing bars, and a high-frequency current is caused to flow in the conductor 10, thereby generating Joule heat due to eddy current generation in the reinforcing bars. As a result, the reinforcing bars are heated to a temperature of about 200° C. It is possible to eliminate damage such as vacancies due to growth of lattice defects through annealing treatment of naturally cooling the reinforcing bars after the heating.

Thus, the repair apparatus 1 according to the embodiment includes the strip-shaped conductor 10 including the plurality of conductive wires 11 arranged in the height direction, the plurality of conductive wires 11 being arranged in parallel to each other, and the high-frequency current generation unit 20 that supplies the high-frequency current between the conductive wires 11 of the first end side 10a of the conductor 10 and the conductive wires 11 of the second end side 10b of the conductor 10. This makes it possible to repair damaged reinforcing bars in the structure.

Installation of Conductor

Figures 2A, 2B:
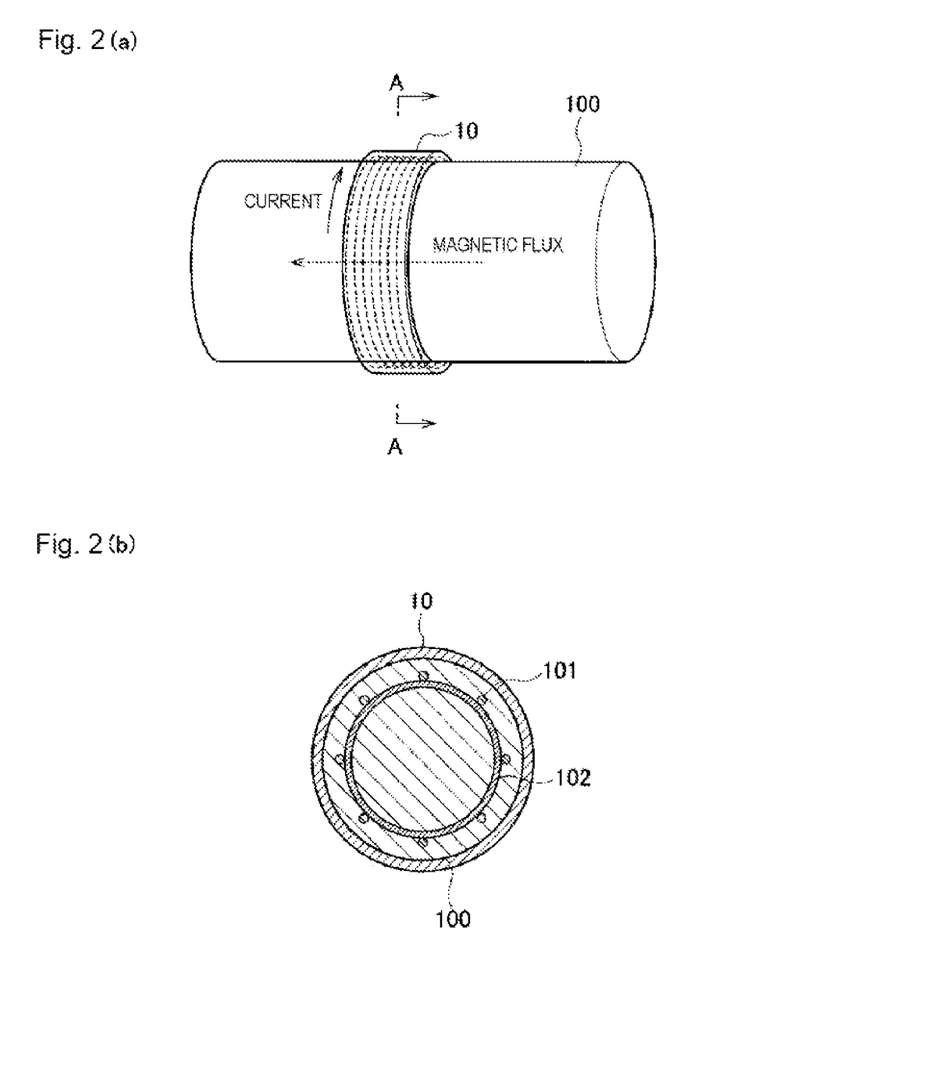
FIG. 2(a) is an appearance view.
FIG. 2(b) is a cross-sectional view illustrating a cross section along line A-A.

FIG. 2 is a diagram schematically illustrating an example in which the conductor 10 is installed around a cylindrical structure. FIG. 2(a) is an appearance view, and FIG. 2(b) is a cross-sectional view along line A-A.

As illustrated in FIG. 2, the conductor 10 is installed on a surface of the structure 100, and a high-frequency current is supplied from the high-frequency current generation unit 20 (not illustrated) to the conductor 10 to generate a magnetic flux by electromagnetic induction. The magnetic flux causes an eddy current to flow in reinforcing bars 101 and 102 embedded in the structure 100 to generate Joule heat.

The reinforcing bars 101 are reinforcing bars that are linearly embedded in an extending direction of the structure 100. The reinforcing bars 102 connect the plurality of reinforcing bars 101 to each other in a direction orthogonal to an extending direction of the reinforcing bars 101, and are in an annular shape in this example.

Figure 3:
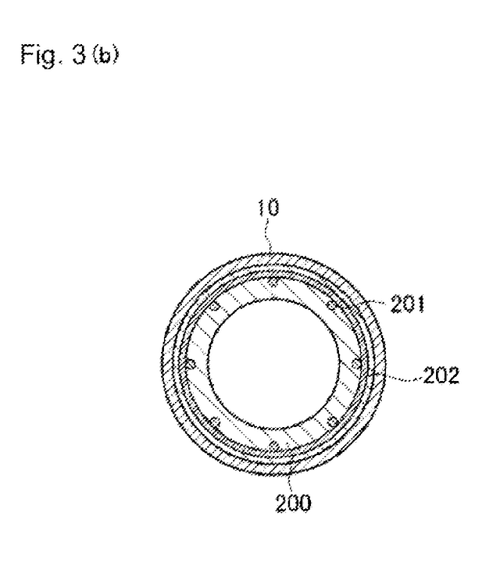
FIG. 3 is a diagram schematically illustrating a state in which the conductor of the repair apparatus illustrated in FIG. 1 is installed around a utility pole.

FIG. 3 is a diagram schematically illustrating an example in which the conductor 10 is installed on a surface of a structure disposed in a height direction. FIG. 3(a) is an appearance view, and FIG. 3(b) is a cross-sectional view along line B-B. A structure 200 illustrated in FIG. 3 is, for example, a concrete utility pole. The structure 200 differs from the structure 100 in that a central portion is hollow, but is the same in that the structure is a concrete structure. Therefore, a detailed description of FIG. 3 is omitted.

When the conductor 10 is installed on a surface of the structure 200 disposed in a height direction as illustrated in FIG. 3, the conductor 10 falls due to gravity. Thus, it is necessary for the conductor 10 to be fixed so that the conductor 10 does not fall.

Figure 4:
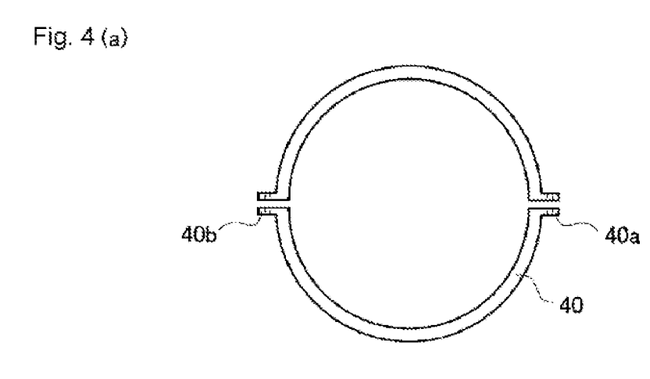
FIG. 4 is a diagram schematically illustrating an example of a fixture constituting the repair apparatus according to the first embodiment of the present invention.

FIG. 4 is a diagram schematically illustrating an example of a fixture for fixing the conductor 10. FIG. 4(a) is a top view and FIG. 4(b) is a front view.

FIG. 4 is a diagram illustrating an example of a fixture 40 corresponding to the structure 200 (a utility pole). The structure 200 has a taper formed on the surface in the height direction, and thus a dimension of an upper end is smaller than that of a lower end in correspondence with the tapered surface. When the surface of the structure 200 is a cylinder that does not have a tapered surface, an upper end and a lower end of the fixture 40 have the same size.

Further, FIG. 4 illustrates an example in which the fixture 40 is divided into two in an outer circumferential direction of the structure 200. The number of divisions may be two or more.

The fixture 40 illustrated in FIG. 4 includes fixing portions 40a and 40b provided to project outward from an outer circumference at positions that face in a diametrical direction of the fixture 40. The two fixtures 40 are disposed to sandwich the structure 200, and for example, bolts (not illustrated) are inserted into the respective fixing portions 40a and 40b and fixed with nuts (not illustrated).

Figure 5A:
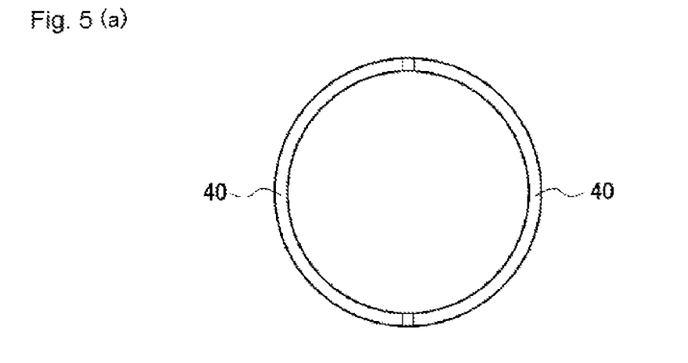
FIG. 5(a) is a top view.
Figure 5B:
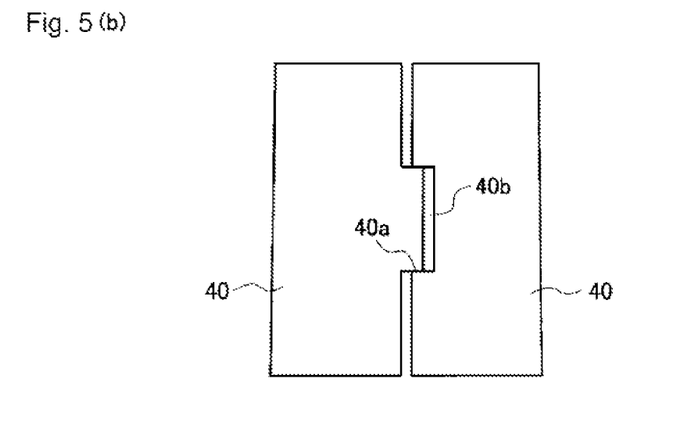
FIG. 5(b) is a front view.

FIG. 5 is a diagram schematically illustrating another example of the fixture 40. FIG. 5(a) is a top view and FIG. 5(b) is a front view.

The fixture 40 illustrated in FIG. 5 illustrates an example of a structure in which portions obtained by dividing the fixture 40 into two are fitted together. The two divided portions of the fixture 40 illustrated in FIG. 5 each include a convex fixing portion 40a and a concave fixing portion 40b.

When a convex portion of the fixing portion 40a is fitted into a concave portion of the fixing portion 40b, the fixture 40 is fixed to the surface of the structure 200. The fixture 40 in this case is made of an elastic material and is fixed to the surface of the structure 200 by elastic stress. In the embodiment, because heat resistance is required, the material is preferably a high heat resistant plastic, FRP, or the like.

As described above, the repair apparatus 1 according to the embodiment includes the fixture that fixes the conductor 10 wrapped around the surface of the structure 200 disposed in the height direction. This allows the conductor 10 to be stably installed on the surface of the structure 200.

Figure 6:
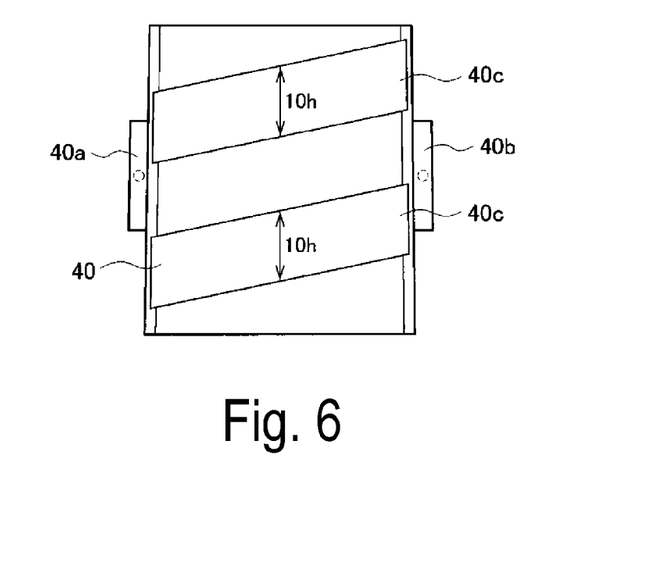
FIG. 6 is a diagram schematically illustrating an example in which a groove for accommodating the conductor is formed on an inner surface of the fixture illustrated in FIG. 4.

Further, a groove may be provided on the inner side of the fixture 40 for the purpose of installing the conductor 10 more stably. FIG. 6 is a diagram schematically illustrating an example in which a groove 40c into which the conductor 10 is inserted is provided on the inner side of the fixture 40. A width of the groove 40c illustrated in FIG. 6 has a size allowing the conductor 10 to be received, which can stabilize the conductor 10.

When the structure 200 is a cylinder that does not have a taper on a surface in a height direction, it is only required to prepare one (one type of) fixture 40 having any length. That is, in this case, the fixture 40 is moved to a position of the structure at which there is concern over deterioration of the reinforcing bars, such as a crack position of the concrete, to fix the conductor 10.

Further, when the structure 200 is, for example, a utility pole in which a taper is formed on a surface in the height direction, it is necessary to prepare a plurality of types of fixtures 40 having a shape according to a taper ratio A (Equation (1)) of the tapered surface.

Math. 1

$$A = \frac{(D-d)}{L} \quad (1)$$

Here, D represents a large diameter, d represents a small diameter, and L represents a height (a length).

Figure 7A:
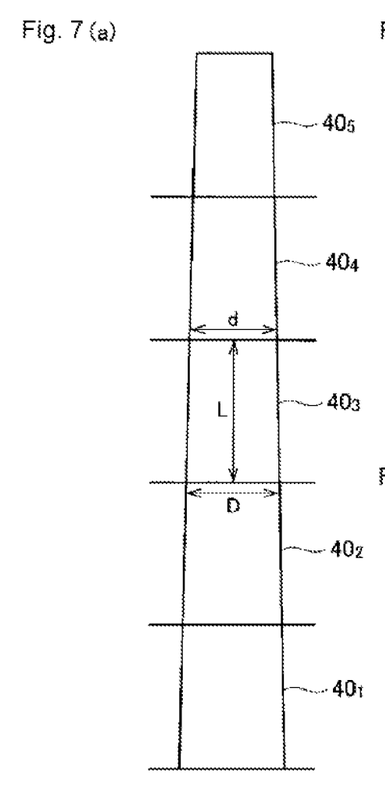
FIG. 7(a) is a front view.
Figure 7B:
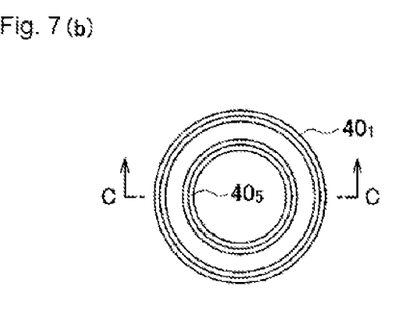
FIG. 7(b) is a top view.
Figure 7C:
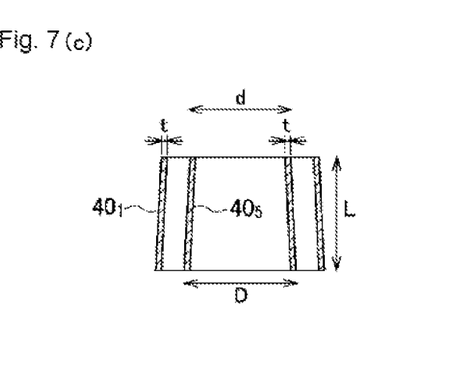
FIG. 7(c) is a cross-sectional view illustrating a cross section along line C-C.

FIG. 7 is a diagram schematically illustrating a case in which a cylinder having a taper ratio A is divided in a height direction to manufacture a plurality of fixtures. FIG. 7(a) is a front view, FIG. 7(b) is a top view in which the manufactured fixture is disposed in a nested state, and FIG. 7(c) is a cross-sectional view along line C-C.

In FIG. 7, indication of the fixing portions 40a and 40b is omitted. Further, indication of the division in an outer circumferential direction is omitted.

That is, the fixture 40 is divided in the height direction to be adapted to the tapered surface and also divided along the outer circumference to be adapted to the outer circumference in a direction orthogonal to the height direction. This allows the conductor 10 to be stably installed on the surface of the structure 200 having a tapered surface in the height direction.

FIG. 7(a) illustrates an example in which the structure 200 is divided into five fixtures $40_1$ to $40_5$ each having a height L in a height direction. As the height L decreases, an installation position of the fixture can be selected from more options. This however increases the number of fixtures. Thus, it is preferable to prepare a specific fixture 40 adapted to a specific portion according to deterioration characteristics of the structure 200. The deterioration characteristics are, for example, characteristics such as remarkable deterioration of reinforcing bars at a specific height from a ground surface or cracks in concrete when the structure 200 is a concrete utility pole. A repair task can be efficiently performed when the fixture 40 adapted to the specific portion according to the deterioration characteristics is prepared.

The nested state is a state in which the fixture 40 corresponding to a small outer shape is disposed on the inner side of the fixture 40 corresponding to a large outer circumference. In this case, a thickness t of the fixture 40 satisfies a condition expressed by the following equation, making it possible to convey a plurality of fixtures 40 in a nested state.

FIG. 7(b) is a top view schematically illustrating the nested state. The fixture $40_5$ is disposed on the inner side of the fixture $40_1$.

Math. 2

$$t < \frac{L \times A}{2} \quad (2)$$

That is, the thickness t of the fixture 40 divided in the height direction so that the fixture 40 is adapted to the tapered surface is smaller than one half of a value obtained by multiplying the height L of the fixture 40 by the taper ratio A. By substituting Equation (1) into Equation (2) the expression t<(D−d)/2 is obtained.

That is, the thickness t of the fixture 40 is made smaller than one half of a value obtained by subtracting a small diameter d from a large diameter D, making it possible to convey the plurality of fixtures 40 in a nested state. That is, the plurality of fixtures 40 in the nested state can be received in a small space and conveyed.

FIG. 7(c) illustrates a cross section along line C-C when the fixture $40_5$ is disposed on the inner side of the fixture 40. When the thickness t of the fixture 40 satisfies the condition of Equation (2), the other fixtures $40_2$ to $44_4$ can be disposed (received) between the fixtures $40_1$ and $40_5$, although indication thereof is omitted in FIG. 7(c).

Second Embodiment

Figure 8:
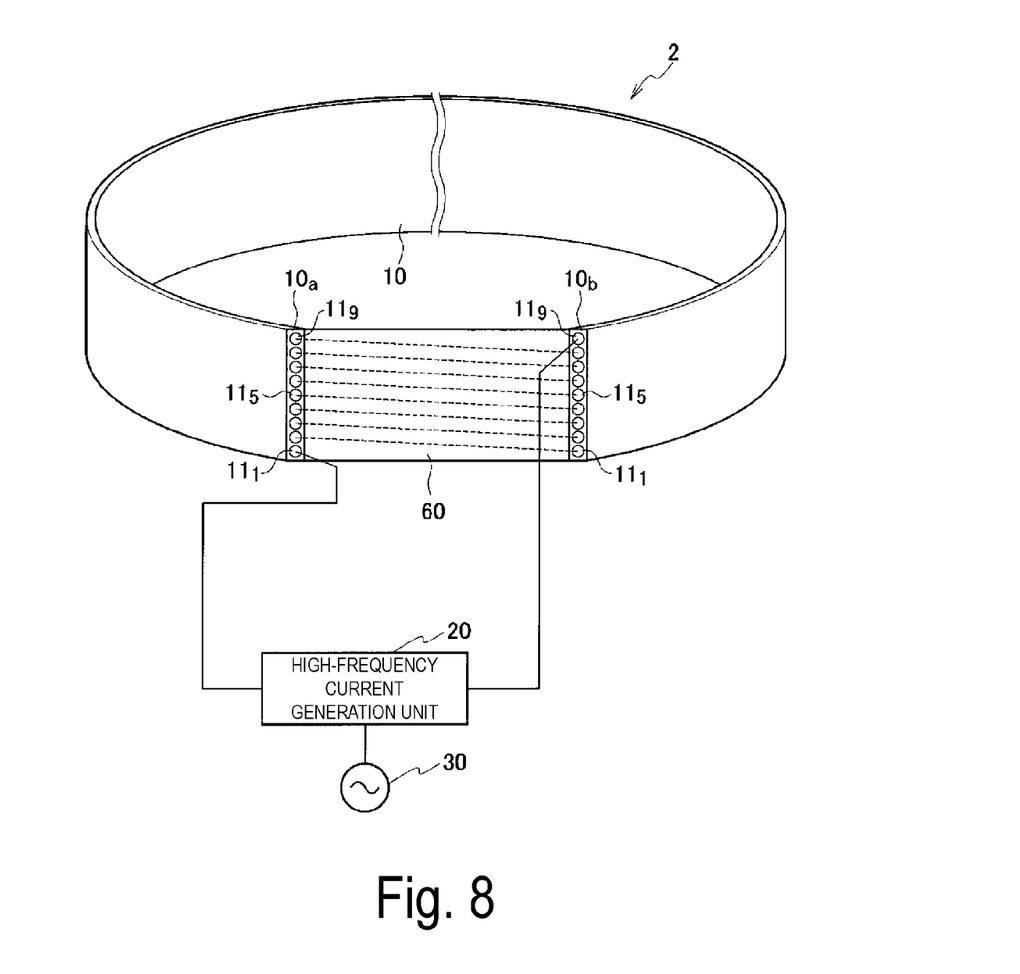
FIG. 8 is a schematic diagram illustrating an example of a configuration of a repair apparatus according to a second embodiment of the present invention.

FIG. 8 is a diagram schematically illustrating an example of a configuration of a repair apparatus according to a second embodiment of the present invention. The repair apparatus 2 illustrated in FIG. 8 differs from the repair apparatus 1 (FIG. 1) in that the repair apparatus 2 includes a connection body 60.

The connection body 60 connects a plurality of conductive wires 11 to each other, and connects a first end side 10a and a second end side 10b of a conductor 10 so that the conductive wires 11 form a coil. The connection body 60 connects the conductive wire $11_1$ (a lower end) of the second end side 10b and the conductive wire $11_2$ of the first end side 10a.

Similarly, the conductive wires $11_2$, $11_3$, $11_4$, $11_5$, $11_6$, $11_7$, and $11_8$ of the second end side 10b are connected to the conductive wires $11_3$, $11_4$, $11_5$, $11_6$, $11_7$, $11_8$, and $11_9$ of the first end side 10a, respectively. A high-frequency current is supplied from a high-frequency current generation unit 20 between the conductive wire $11_1$ of the first end side 10a and the conductive wire $11_9$ of the second end side 10b.

The connection body 60 may connect the conductive wire $11_9$ (an upper end) of the second end side 10b and the conductive wire $11_8$ of the first end side 10a. In this case, the conductive wires $11_8$, $11_7$, $11_6$, $11_5$, $11_4$, $11_3$, and $11_2$ of the second end side 10b are connected to the conductive wires $11_7$, $11_6$, $11_5$, $11_4$, $11_3$, $11_2$, and $11_1$ of the first end side 10a, respectively. A high-frequency current is supplied from the high-frequency current generation unit 20 between the conductive wire $11_9$ of the first end side 10a and the conductive wire $11_1$ of the second end side 10b.

The repair apparatus 2 according to the second embodiment includes the connection body 60 that connects the plurality of conductive wires 11 to each other, and connects the first end side 10a and the second end side 10b of the conductor 10 so that the conductive wires 11 form a coil, and the high-frequency current generation unit 20 supplies a high-frequency current between the conductive wire 11 at the upper end or the lower end of the first end side 10a of the conductor 10 and the conductive wire 11 at the lower end or the upper end of the second end side 10b of the conductor 10. This can increase the number of turns of the conductive wires 11 and a magnetic flux density of a magnetic flux required for electromagnetic induction heating.

The connection body 60 may combine a plurality of conductive wires 11 as one set to connect the second end side 10b and the first end side 10a. This makes it possible to decrease a resistance of the conductive wires 11 (the litz wires) and supply a higher high-frequency current.

As described above, with the repair apparatuses 1 and 2 according to the embodiments, it is possible to provide a new apparatus that heats reinforcing bars embedded in a structure through electromagnetic induction heating to repair damaged reinforcing bars. Further, because the strip-shaped conductor 10 is used, any type of a structure can be repaired. Further, using the fixture 40 makes it possible to stably install the strip-shaped conductor on the surface of the structure.

The example in which the number of the conductive wires 11 constituting the strip-shaped conductor 10 is nine has been described, but the present invention is not limited to this example. Further, the example in which the fixture 40 has a shape sandwiching a cylindrical structure has been described, but the present invention is not limited to this example. The fixture 40 may have any shape corresponding to the structure.

Thus, the present invention is not limited to the embodiments, and can be modified within the scope of the gist of the present invention.

REFERENCE SIGNS LIST 1, 2: Repair apparatus
10: Conductor (strip shape)
10a: First end side
10b: Second end side
$11_1$ to $11_9$: Conductive wire
20: High-frequency current generation unit
30: Power supply
40, and $40_1$ to $40_5$: Fixture
60: Connection body
100: Structure
101, 102: Reinforcing bar
200: Structure (concrete utility pole)
201, 202: Reinforcing bar

The invention claimed is:

1. A repair apparatus comprising:
a strip-shaped conductor including a plurality of conductive wires arranged in a height direction, the plurality of conductive wires being arranged in parallel to each other;
a high-frequency current generation unit configured to supply a high-frequency current between the plurality of conductive wires of a first end side of the conductor and the plurality of conductive wires of a second end side of the conductor; and
a fixture configured to fix the conductor wrapped around a surface of the structure disposed in the height direction,
wherein the fixture is divided along a tapered surface in the height direction to be adapted to the tapered surface, and divided along an outer circumference in a direction orthogonal to the height direction to be adapted to the outer circumference.

2. The repair apparatus according to claim 1, further comprising:
a connection body configured to connect the plurality of conductive wires to each other and connect the first end side and the second end side of the conductor so that the plurality of conductive wires form a coil,
wherein the high-frequency current generation unit supplies a high-frequency current between a conductive wire of the plurality of the conductive wires at an upper end or a lower end of the first end side of the conductor and a conductive wire of the plurality of the conductive wires at a lower end or an upper end of the second end side of the conductor.

3. The repair apparatus according to claim 2, wherein a thickness of the fixture divided into a plurality of portions is smaller than one half of a value obtained by multiplying a height of the fixture by a taper ratio of the tapered surface.

4. The repair apparatus according to claim 1, wherein a thickness of the fixture divided into a plurality of portions is smaller than one half of a value obtained by multiplying a height of the fixture by a taper ratio of the tapered surface.

* * * * *